United States Patent [19]

Kelly

[11] 3,838,510
[45] Oct. 1, 1974

[54] VEGETATION CUTTING IMPLEMENT
[76] Inventor: John B. Kelly, 2105 W. 15th Ave., Kennewick, Wash. 99336
[22] Filed: Apr. 16, 1973
[21] Appl. No.: 351,325

[52] U.S. Cl. .................. 30/279 A, 30/116, 172/376
[51] Int. Cl. ........................ B26b 27/00, A01d 1/00
[58] Field of Search ................. 30/318, 116, 279 A; 172/376

[56] References Cited
UNITED STATES PATENTS

| 790,760 | 5/1905 | Stuart | 172/376 |
|---|---|---|---|
| 1,601,382 | 9/1926 | Tiemann | 172/376 |
| 2,056,007 | 9/1936 | Jaenichen | 172/376 |
| 2,741,969 | 4/1956 | Strecker | 172/376 X |
| 3,388,469 | 6/1968 | Neiiendam | 30/116 |

Primary Examiner—Al Lawrence Smith
Assistant Examiner—J. C. Peters
Attorney, Agent, or Firm—John B. Armentrout

[57] ABSTRACT

Features are disclosed relating to a vegetation cutting implement which is characterized by having a frame and a handle, the frame comprising a pair of arms having longitudinally curved outer end portions extending in a plane transverse to the lead of the handle and the outer end portions of the arms having end members including abutments and support structures extending laterally of the arms from the abutments. A cutting element of the implement has opposite end portions secured to the arms, with the cutting element extending longitudinally in tension and spanning a space between the arms and having end portions resting against the abutments and support structures for the cutting element to cut down vegetation as the implement is moved.

5 Claims, 6 Drawing Figures

PATENTED OCT 1 1974

3,838,510

VEGETATION CUTTING IMPLEMENT

The present invention relates to lawn, garden and farm manually operable implements and is more especially concerned with hand operated cutting implements which have utility for cutting down vegetation.

An object of this invention is the provision of a manually operable weed cutting implement which is capable of maintaining a weed cutting element thereof under tension and has sharp-edged frame portions for cutting with the weed cutting element.

Another object herein is that of providing a weeder wherein portions of a weed cutting element resting upon a frame of the weeder are effectively arrested against deflecting laterally of the cutting element while the latter is kept in tension and is cutting weeds.

A further object herein is to provide a weed cutting device wherein an intermediate portion of a cutting element is integral with opposite transverse end portions of the cutting element which are secured to the frame of the weeder, and the cutting element, being kept in tension to the points of securement, is moderately curved against moderately curved portions of the frame between the aforementioned end portions and intermediate portion to protect against fracture of the securely held tensioned cutting element.

Another object herein is the provision of a weed cutting implement offering interchangeability of cutting elements so as to enable the implement to be used to present a cutting element which includes either strip or wire to vegetation which accordingly is to be cut.

Other objects of this invention in part will be obvious and in part pointed out more fully hereinafter.

In accordance with the present invention, implements are provided wherein a handle and a frame of the implement are interrelated with a cutting element which is mounted on the frame and is kept taut to cut down vegetation, such as weeds, on manual operation of the implement. The frame includes a pair of arms, and outer portions of those arms are attached to opposite end portions of the cutting element for supporting the cutting element with the latter being in tension. At least the outer portions of the pair of frame arms lie substantially in a plane which is transverse to the longitudinal lead of the handle, thus for the cutting element in normal use to be below the lead of the handle and effective for cutting in response to a backward movement of the implement by force manually applied to the handle.

In certain embodiments which are preferred, the lower end portions of the frame are sharp, disposed to cut with the cutting element in the normal backward direction of movement of the implement, thereby reducing the obstructing effect of vegetation against the frame or reducing the obstructing effect of the soil should the implement for example be used to fulfill an earth tilling function during which the frame outer end portions and the cutting element pass beneath the surface of the soil.

Another feature within the scope of the present invention resides in providing abutments on the outer end portions of the pair of frame arms, and having those abutments serve as lateral rests for portions of the cutting element while the latter portions longitudinally extend supported on the outer end portions of the pair of frame members. The abutments accordingly used trail the cutting element laterally of the cutting element thus to prevent lateral movement of the adjacent portions of the cutting element when the leading lateral surface of the cutting element is brought into cutting contact with vegetation.

The cutting element, extending from points of attachment to the pair of frame arms and toward the outer ends of these frame arms, and thus bending in tension, advantageously includes moderately curved portions which are integral with opposite ends of an intermediate portion of the cutting element, having that intermediate portion span the distance between the pair of frame arms, while the outer end portions of the frame arms also are moderately curved inwardly toward one another laterally from opposite outer sides of the implement thus affording curved surfaces against which the curved portions of the cutting element rest and conform as moderately curved. The cutting element accordingly is easily connected adjacent to its ends to the frame and in view of the moderate curvature of the cutting element against the moderately curved surfaces of the frame arms, the cutting element is spared the danger of fracture caused by sharp bends when placed in tension.

Among still other features sometimes introduced according to the present invention is the feature of having in the implement an adjustable interconnection between intermediate portions of the pair of frame arms for varying the distance of separation of the outer end portions of those arms, thus for bringing the tension in the cutting element to be consistent with having the cutting element tensioned adequately for cutting.

In the accompanying drawing representing a presently preferred embodiment of the present invention:

Figure 1:
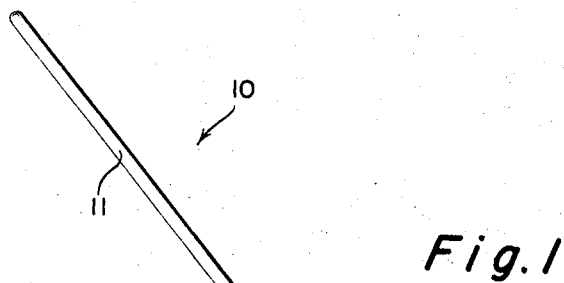
FIG. 1 is a perspective view of a manually operable vegetation cutting implement.
Figure 2:
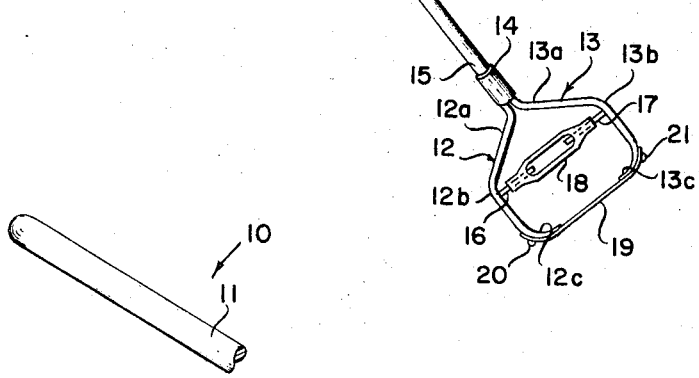
FIG. 2 is a side elevational view of the implement represented in FIG. 1.
Figure 3:
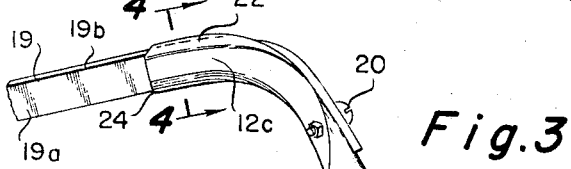
FIG. 3 is a perspective view of the outer end of one of the frame arms showing the relationship of the cutting member and the frame arm.

Referring now more particularly to FIGS. 1 and 2 of the accompanying drawing a vegetation cutting implement, such as for lawn, garden or farm use for cutting weeds or clearing away other vegetable growth, is represented, and is designated in general by the reference numeral 10. The implement includes a substantially straight handle 11, such as of metal or wood, and is of a length for the implement to be wielded in use by a person who is standing. A frame of the implement includes a pair of arms 12 and 13, preferably made of steel, which are rigidly engaged with the handle 11 through use of a ferrule 14 receiving the outer end 15 of the handle. Screw threaded rods 16 and 17 which are integral at their one ends with intermediate portions 12b and 13b of the frame arms 12 and 13 project on a common axis toward one another and receive a trunbuckle 18 on their threads, the threads having leads which are opposed enabling the distance between the outer ends of the frame arms to be altered by angular movement of the turnbuckle. As will be readily understood by referring to FIGS. 1 and 2, the portions 12a and 13a of the frame arms 12 and 13 which are most proximate to the handle 11 are in a plane substantially in common with the handle while these same frame arms in regions outermost from the handle are substantially in a plane which is transverse to the handle, there having moderately curved outer end portions 12c and 13c which progress laterally of the implement on those curvatures so as to have the outer ends of the arms 12 and 13 directed toward one another.

A flexible cutting blade 19 made for example of strap steel has apertures adjacent ot its opposite ends, through which apertures set screws 20 and 21 are received and are threadedly engaged in corresponding apertures, leading from opposite lateral sides of the implement 10 into the arms 12 and 13, for securing the cutting blade to the implement frame. Furthermore, in the present embodiment, the frame arm end portions 12c and 13c are tapered toward the outer ends of arms 12 and 13, starting from being substantially circular and through thinning by being substantially reduced in thickness between inner and outer sides of those arms in the implement, this also with being moderately curved as a aforementioned. There are abutments 22 and 23 formed as flanges on lateral sides of end members of the frame arm portions 12c and 13c, which end members also include support structures extending transversely of arms 12 and 13 from the abutments for the cutting element to rest against the support structures and which abutments trail cutting edges 24 and 25 on these same end members during a normal cutting stroke made with the implement 10. The cutting blade 19 rests at trailing edge 19b against the abutments 22 and 23 and presents a cutting edge 19a which is combined with the cutting edges 24 and 25 for the implement 10 to produce a cutting action beyond that which is produced by edge 19a intermediately of the frame arms 12 and 13 on a cutting stroke made with the implement and involving movement of the handle 11 backwardly by a person using the implement with the cutting edge 19a being toward that user.

Once the cutting blade 19 has been attached to the implement frame by means of screws 20 and 21 so as to extend outside the outer moderately curved faces of the frame arm portions 12c and 13c, the turnbuckle 18 is adjusted on the screw threaded rods 16 and 17 to draw the blade taut against these moderately curved faces and intermediately of the arms 12 and 13 so as to attain proper tension to stabilize the blade for cutting which is to follow through use of the implement.

Figure 5:
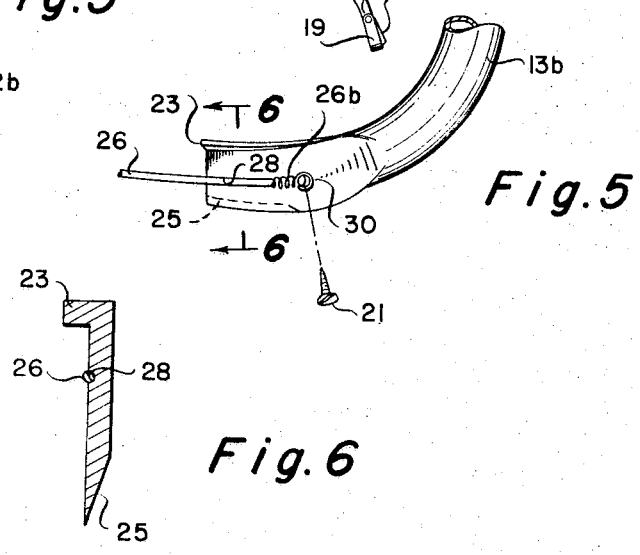
FIG. 5 is a view similar to FIG. 3 showing a modified cutter member.
Figure 4:
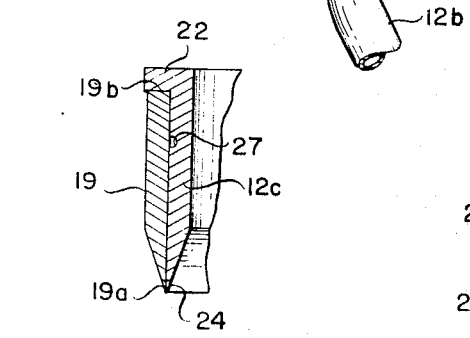
FIG. 4 is an enlarged sectional view taken on line 4—4 of FIG. 3.
Figure 6:
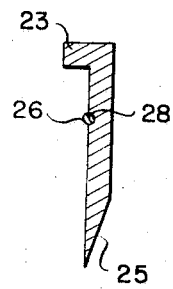
FIG. 6 is an enlarged sectional view taken on line 6—6 of FIG. 5.

A cutting element 26, represented in FIGS. 5 and 6, includes a strand of wire and may be used interchangeably with the cutting element 19 on the frame of implement 10. Thus, between the abutments 22 and 23 and the cutting edges 24 and 25 of the outer frame arm portions 12c and 13c, the latter portions have longitudinal grooves 27 and 28 therein which moderately curve with those arm portions and receive corresponding portions of the wire of cutting element 26 for laterally stabilizing the wire. Cutting element 26 further includes helically convoluted end portions 26a and 26b which are united with eyelets 29 and 30 for receiving the set screws 20 and 21. Screws 20 and 21 advantageously secure the cutting element 26 to the implement frame through entering the same apertures in the frame as are used for these set screws to secure the cutting blade 19 to the frame. By adjusting the turnbuckle 18 on the screw rods 16 and 17, the cutting element 26 is drawn taut following the moderate curvatures of outer frame end portions 12c and 13c in the grooves 27 and 28 and is given proper tension for cutting vegetation when the implement 10 thus is used. In such use, the outer frame end portions 12c and 13 c offer abutments represented by walls of the grooves 27 and 28 for laterally stabilizing the wire, and the cutting edges 24 and 25 are effective for widening the cutting swath produced by the wire intermediately of the outer frame portions 12c and 13c. Preferably, the wire in cutting element 26 is of steel such as the piano wire grade. The helically convoluted end portions 26a and 26b are beneficially used to contribute resilience under such conditions as where the cutting element 26 encounters an obstinate obstruction.

As the invention leads itself to many possible embodiments, and as many possible changes may be made in the embodiment hereinbefore set forth, it will be distinctly understood that all matter described herein is to be interpreted as illustrative and not as a limitation.

I claim:

1. A vegetation cutting implement including, a frame and a handle, said frame comprising a pair of arms extending on opposite lateral sides of said implement and having outer end portions longitudinally curved toward one another lying in a plane which is transverse to said handle, end members of said outer end portions of said arms being longitudinally opposed and including transverse normally trailing abutments and normally leading support structures extending transversely of said arms from said abutments, and said implement further including a cutting element attached to said arms and having opposite end portions passing over outside longitudinally curved faces of said outer end portions of said arms, and said cutting element being maintained in tensions spanning a space between said end members of said outer end portions of said arms and having said opposite end portions of said cutting element resting against said support structures of said end members and against said abutments in a leading relation to the latter, for said cutting element laterally restrained and trailed by said abutments and supported by said support structures of said end members to produce a cutting action during a cutting stroke achieved with said implement.

2. A vegetation cutting implement as set forth in claim 1 wherin said end members of said outer end portions of said arms include transverse normally leading sharp cutting edges and said sharp cutting edges are disposed for leading with said cutting element and sharing in the cutting action of said cutting element during a cutting stroke produced with said implement.

3. A vegetation cutting implement as set forth in claim 2 wherein said cutting element includes a strap having a sharp cutting edge disposed for leading with said sharp cutting edges of said end members and sharing in a cutting action with said sharp cutting edges of said end members during a cutting stroke produced with said implement.

4. A vegetation cutting implement as set forth in claim 2 wherein said cutting element includes a wire disposed for leading with said sharp cutting edges of said end members and sharing in a cutting action with said sharp cutting edges of said end members during a cutting stroke produced with said implement.

5. A vegetation cutting implement as set forth in claim 1 wherein said cutting element used in said implement may include either a strap or a wire interchangeably for cutting vegetation, and means are provided for attaching either opposite end portions of said strap or opposite end portions of said wire to said arms, said strap attached to said arms and tensioned spanning the space between said arms having opposite end portions resting against said abutments and said support structures, and there being grooves in said support structures of said end members and said grooves leading longitudinally of said arms and receiving opposite end portions of said wire having said opposite end portions of said wire attached to said arms in lieu of said strap and said strap tensioned spanning the space between said arms.

* * * * *